(12) United States Patent
Carvalko, Jr.

(10) Patent No.: US 6,432,298 B1
(45) Date of Patent: Aug. 13, 2002

(54) PURIFIER FOR SEPARATING LIQUIDS AND SOLIDS

(76) Inventor: Joseph R. Carvalko, Jr., 188 Iron Ore Hill Rd., Bridgewater, CT (US) 06752

( * ) Notice: Subject to any disclaimer, the term of this patent is extended or adjusted under 35 U.S.C. 154(b) by 0 days.

(21) Appl. No.: 09/286,576

(22) Filed: Apr. 5, 1999

(51) Int. Cl.[7] .............................................. B01D 35/00
(52) U.S. Cl. ...................... 210/86; 210/512.1; 210/521; 210/532.1; 210/540
(58) Field of Search ................................. 210/521, 522, 210/512.1, 532.1, 538, 540, 86, 787, 788, 789, 799, 800, 801, 802

(56) References Cited

U.S. PATENT DOCUMENTS

| | | | | |
|---|---|---|---|---|
| 472,488 A | * | 4/1892 | Strong | 210/512.1 |
| 815,407 A | * | 3/1906 | Cooper | 210/512.1 |
| 1,400,622 A | * | 12/1921 | Nordell | 210/512.1 |
| 1,921,689 A | * | 8/1933 | Meurk | 210/512.1 |
| 2,068,140 A | * | 1/1937 | Jaquith | 210/512.1 |
| 2,717,695 A | * | 9/1955 | Martin | 210/512.1 |
| 4,147,630 A | * | 4/1979 | Laval, Jr. | 210/512.1 |
| 4,451,366 A | * | 5/1984 | Smisson | 210/512.1 |
| 4,497,714 A | * | 2/1985 | Harris | 210/512.1 |

* cited by examiner

Primary Examiner—Robert J. Popovics

(57) ABSTRACT

The present invention is an apparatus and a method that separates petroleum products such as fuel oil and gasoline from other foreign constituents, such as water and organic and inorganic solids. In the present invention a petroleum product and its undesirable impurities enters a cylindrical chamber having an input port and an output port. Within the container exists a longitudinal input chamber which forces the fluid to assume a velocity, acceleration and direction as it progresses through the chamber and finally ejected through a nozzle which directs the fluid into a concave surface to produce a rotation of the fluid. Due to centrifugal and other physical forces, components of greater specific gravity are deflected at an angle relatively smaller than components having a larger specific gravity. The petroleum products such as fuel, which have lower specific gravity than either water or solid constituents such as sand and sediment, flow away from the convex barrier and are swept into the current of the fluid as it makes it way under pump pressure to the output port. The heavier specific gravity components settle and tend towards a sump at the bottom of the large container.

7 Claims, 5 Drawing Sheets

PURIFIER FOR SEPARATING LIQUIDS AND SOLIDS

FIELD OF THE INVENTION

The present invention relates to separating liquids such as petroleum based oils, fuels oils and gasolines from organic and inorganic substances such as water, algae and solids.

BACKGROUND OF THE INVENTION

Petroleum products are the mainstay of modern industry. Produced as oils they are used in lubrication, as power transfer mediums. In distillate forms such as diesel oil and gasolines they are used in the combustion engine. Because of their importance in every phase of commerce and industry new and improved processes and apparatuses for insuring the quality of petroleum products is vitally important to the industrial sector.

Keeping fuel and other oils free from contamination while storage tanks is a constant challenge for users of petroleum products. Contaminants such as water, salt, rust, and other unwelcome ingredients, even bacteria, invade fuel supply tanks and eventually wreck havoc on an engine or power plant. Managing this problem may take a combination of technologies from centrifuges to an arsenal of water strippers, fuel/water separators, media filtration, mesh screens and chemicals.

Other machinery that benefits from devices that can remove water and other unwanted constituents are those that burn fuel oil such as generators of electricity and oil burners. These machines and burners typically utilize heavy fuel oils generally known by various grades of heating oils and diesel fuels. Marine engines, diesel automobiles and trucks, stationary generators and home oil burners burn differing qualities of fuel oils that can benefit from devices that can remove foreign constituents. Many devices exist for separating fuel from foreign constituents, however, most of these are expensive and rely on mechanical mechanisms and filtration media.

For example, reliable operation internal combustion engines and power generation stations depend on fuels free from contaminants such as water and organic and inorganic solids. Additionally, fuel oil that contains water can freeze fuel lines when temperatures drop below 32 degrees Fahrenheit. Water in oil or fuel also reduces the efficiency of engine performance since at least some energy is dissipated in the process of heating the water and not in combustion as well as the water contributing to the oxidation of metal parts. In many instances, water particulate contribute to engine failure, specifically in engines that utilize injectors to atomize fuel for the combustion chambers. Solid particulate in fuel decreases the efficiency and increases the wear due to frictional forces on internal engine parts. When oil is used as a hydraulic fluid it is important that water and other contaminants be kept to a minimum to reduce wear on components and to maintain the action of the fluid in for its intended purpose.

For ships, it is not uncommon for fuel to remain in storage or service tanks for weeks and for sea water to be carried as ballast in emptied fuel tanks. Bunkering, transport, and long storage periods coupled with the intentional introduction of water, create the perfect environment for water and algae which can clog filters, fuel and injector pumps and start a chain of events which may lead to catastrophic engine failure. In the diesel engine, contamination, whether bacteria, sediment or water, can blow injector tips and cause immediate cylinder scoring.

Selecting the processes that provide treatment of water contaminated fuel and oil supply for modern gas turbine and diesel engines depends on properly assessing competing tradeoffs such as: cost, reliability, performance and importantly, application. Not surprisingly, the process of purification relates strongly to the application, that is, the device or engine technology, together with the grade of oil or fuel it will use and how the fuel is stored.

A best engineered solution for fuel purification considers both cost and performance. Electromechanical centrifuges are a popular solution, performance-wise, for purifying fuels in the light crude oil and heavy fuel oils category because these are only partly refined before delivery to the ship's tanks. But, distillates do not need the same level of purification, because they are already highly refined. Electromechanical centrifuges may not be the most cost efficient here, because distillates only require that contaminates introduced in transport or during storage, need removal.

Especially for distillate fuels such as No. 2 Diesel, products now exist to eliminate water and sediment by combining centrifugal fuel flow with a sedimenter technology. Unlike their electomechanical centrifugal counterparts, these products contain no filter media or moving parts, except for the fuel pump needed to keep the fuel flowing. These products have the advantages of: low investment cost, low maintenance costs, high reliability, and the ability to employ cross connected links, permitting various real time configurations to suit a ship's immediate purification needs.

It is well known that impurities such as the presence of an electrolyte or soap in the fluid will cause the water and oil mixture to stabilize. For example, when soap is added to water and oil the result is a stable emulsion that permit the combination to easily be separated from metal and other surfaces, but difficult to separate from each other. But, water and oil can exist in three different states. Free water and oil can remain separate constituents, so called immiscible. In this combination water flows freely in the body of generally greater viscosity oil. The second is the unstable emulsification of oil and water that generally forms droplets of the combination. Here the water/oil forms globules which flow separate from the free water and oil. Thirdly, there is the stable mixture of water and oil.

In the second case, where oil and water are mixed, for example by agitation when oil and water are contained in the same storage tank being used to fill a supply tank, an unstable colloidal dispersion may result. The first colloid is of water in oil and the second oil in water. Coalescing of these colloidal droplets separate into a top layer of oil and a bottom layer of oil. In a tank or sump the water generally settles to the bottom and the oil on the top of the water. And, because oil and water are relatively immiscible, if there is a positive pressure applied during the flow of oil and water the two constituents can be separated into different paths.

The dynamics of the so called emulsified droplets depend to a large degree upon the drag coefficients and flow characteristics of the liquid, ranging from laminar flow to turbulence and defined by the Reynolds number. In defining the values of the energy undertaken by the emulsified particle in a fluid flow we look to the relative value between the emulsified droplet and the bulk fluid.

According to Stokes law, a particle such as an emulsified oil/water particle, falling under the action of gravity will accelerate until the frictional drag of the fluid just balances the gravitational acceleration after which it continues to fall under constant velocity, know as the free settling velocity. To capitalize on the Stokes principle in separating a water particle from an oil particle, the flow of the oil/water mass should remain relatively laminar.

U.S. Pat. No. 4,986,907 describes a diesel fuel refining apparatus that works on a principle of centrifugal forces from a motion the fuel is forced to undergo as it is drawn through the apparatus under the pressure of a pump. In this disclosure claimed centrifugal forces are created when the fuel discharges from an interior pipe and impacts against a pre heated generally flat rectangular metal plate which runs diametrically across a cylindrical container and also substantially longitudinally the length of the interior of the cylinder housing. Due to the preheating of the plate and the angular relationship maintained by the conduit and the plate, the fuel that leaves the pipe and hits the plate is projected to create a turbulence that is claimed to facilitate separation of the fuel components such as water, sulfur, and sulphuric acid. However, turbulence may not be the most efficient mechanism to separate water from oil.

SUMMARY OF THE INVENTION

In summary the invention herein disclosed is an apparatus for purifying a liquid, typically a petroleum product, being drawn through the apparatus by the force of a pump, such that the liquid has at least two relatively immiscible constituents with diverse properties, at least one of such property is specific gravity, which comprises a cylindrically shaped container having an input port in fluid communication with an output port, and one or more chambers therein such as an input chamber of decreasing cross section having a discharge nozzle which directs the liquid into the direction of a concave surface, such that due to centrifugal forces acting on differences in specific gravity and viscosity, heavier constituents come to rest in a settling chamber and lighter constituents flow through a first separation chamber and discharge into a second separation chamber whereby the liquid is channeled in a downward position relative to the point the liquid rose in the first separation chamber and then discharges into an output chamber before it is discharged into an output port.

The invention herein is also drawn to a process for purifying a fluid having at least two constituents with diverse properties, where at least one such property is specific gravity, comprising pumping the fluid through a means having an input port in fluid communication with an output port, a means for impinging the fluid into a concave barrier interposed between the input port and the output port, and integral to a settling chamber, such that constituents with the greater specific gravity come to rest in a settling chamber and constituents with the lesser specific gravity flow to the output port.

The apparatus and process herein described, separates water from fuel, fuel oil or oil generally (collectively referred to as petroleum products). It is remarkable in that it contains no moving parts or active filter media, but relies on several scientific and engineering principles to separate water and sediment from petroleum products by utilizing: (1) the relative immiscibility and differences in specific gravity between the water and petroleum products which causes the lighter fuel to precipitate out of the water and thereby prevents water and contaminants from following the precise path of the fuel; (2) centrifugal forces established by virtue of a nozzle the output of which is directed into a cylindrically shaped concave configuration which in turn causes water and contaminants to separate from petroleum products due to their different densities and viscosities; (3) high ratios of surface energy to surface tension, which cause small water particles to form larger droplets on coalescing plates and eventually fall into the settling chamber; (4) weirs to create a stripping action to dislodge water from petroleum products; (5) increasing and decreasing changes in direction, pressure and velocity as the petroleum products pass through various stages within the device to allow the solid contaminants and water to drop out of the petroleum products; and finally (6) differences in viscosity of the various constituents to prevent the water and contaminants from following the precise flow path of the fuel.

The invention herein disclosed separates the contaminates from the petroleum products generally without any added requirement for heat, a heat conducting plate, filtration media or any mechanization.

Under the force of a pump petroleum products and other foreign constituents such as water, algae and sediment, flow into a chamber which conditions the liquid by changing its direction of flow and its velocity and pressure. As the liquid exits the first input chamber, a vortex or rotational flow is created when the liquid is directed against a concave wall of the interior of a cylindrical container and thereafter allowed to circulated in a generally cylindrical volume defined by the settling chamber. The rotation created from the forces of the pump drawing liquid through the system, the liquid being forced into a concave interior surface and of the moving liquid mass (solids and fluids) having differing physical properties such as viscosity and specific gravity. Each constituent will follow a path determined by its individual properties such as its chemical and electronic affinity for the other constituents, viscosity and specific gravity. The liquid or solid under the influence of a centrifugal force as a result of a rotary motion will assume a specific angular acceleration and corresponding angular momentum. Some constituents will be drawn more to the center of rotation and other constituents will circulate further out from the center. During this phase of the operation turbulence is kept to a minimum to better exploit various properties of the liquid under the actions of the dynamic forces employed.

As the dynamic forces due to a pump acting on the liquid diminish to a point where a vortex due to centrifugal forces cannot be sustained, the water, contaminants and oils will generally simply separate in the settling chamber due to gravitational effects. The combined effect of the system is that when flow rates are so low that a sustainable centrifugal force cannot be maintained, separation of the water, contaminants and oil will occur due to gravity and as the centrifugal forces are increased separation will also occur due to the centrifuge effect. In this manner the invention covers the range of flow rates from zero flow to some maximum determined by when the flow is to fast to allow the water and contaminants to assume a damping state and fall into the settling chamber.

Above the region where the cylindrical volume exists is interposed a vertical plate. The vertical plate reduces the tendency toward rotary motion of any liquid that comes in contact with the plate. Since the vertical plate is above the cylindrical volume region, only constituents having a specific gravity above some threshold with respect to constituents having a specific gravity below some threshold will impinge the plate. The liquid constituents that impinge in the vertical plate change direction to conserve momentum under well known laws of physics and are swept in the direction of the fluid current flow provided by the pump.

More specifically, in the present invention, the liquid such as hydraulic oil, diesel oil or gasoline flows through a closed system under pressure supplied by a pump. The liquid and all its extraneous constituents (typically contaminates such as water, sediment, and algae) under the force of the pump enters an orifice of the cylindrical container in a generally parallel attitude with respect to a ground plane or orthogonal to the vertical axis of the cylindrical container.

The orifice is connected to the longitudinal input chamber, which is contained within the larger essentially cylindrical system enclosing chambers and baffles. The longitudinal chamber forces the incoming liquid to change direction through a compound ninety degree angle downward and then a ninety degree angle transverse to the first turn, and then to accelerate under a narrowing of the chamber as it progresses through the chamber towards a distal end where it exits through a constriction or nozzle directed in the general direction of the concave interior surface of the cylindrical chamber. The narrowing of the cross section of the chamber from its proximal end to its distal end results in an increase in the velocity of the petroleum products and its contaminants through the first input chamber.

Upon exiting the nozzle, the fluid is forced into a generally concave surface (the inner surface of a cylindrical chamber can provide such a surface) where the liquid is forced into a spinning or whirlpool-like motion. Here, components of differing specific gravity are deflected at a differing angles due to a combination of centrifugal forces, barriers and properties of the liquid constituents.

The petroleum products or fluid of importance must have a specific gravity lower than the contaminants it filters. For example, fuel oil typically has a specific gravity of between 0.70 and 0.95, whereas water has a specific gravity of 1.0. The heavier specific gravity components do not have the kinetic energy to remain in the current stream and tend to flow towards a lower gravitational potential where a settling chamber at the bottom of the container collects the unwanted constituents. Therefore, water and sediment which are heavier than petroleum products generally will flow away from the concave barrier and settle into the lowest vertical point in the cylindrical chamber referred to as the settling chamber or sump. The lighter petroleum products are swept into the laminar current flow to make its way under pressure of the pump employed through one or more chambers towards the output port.

Petroleum products such as a fuel oil flow into the input port orthogonally with respect to the vertical axis of the cylindrical container. Upon entering the input port and then the longitudinal diverter input chamber fuel impacts a vertical wall or diverter of the first input chamber and is forced to change direction and therefore momentum, into a downward flow through the central passage of the a longitudinal input chamber. As previously indicated, the input chamber has a generally narrowing cross section which forces the fluid to accelerate as it is drawn downward by the force of the pump and gravity. When the fluid containing differing constituents is discharged from the distal end of the input chamber, it is forced to impinge a concave surface integral to a settling chamber, such that constituents with the greater specific gravity come to rest in the settling chamber and constituents with the lesser specific gravity remain in the current stream and proceed through a first separation chamber and eventually flow toward other separation chambers and ultimately the output port.

Through the force of the pump, lesser specific gravity fluid rises in the cylindrical container. The heavier, that is, greater specific gravity components are essentially trapped in the settling chamber by the imposition of a semi-circular half settling ceiling that contains that portion of the cylindrical container referred to as the settling chamber, where the whirlpool or circular currents occur. A vertical wall separates the first separation chamber and one or more subsequent separation chambers through which the lighter fluid flows to the output port.

In one embodiment a second separating chamber is interposed between the first separation chamber and an output separation chamber. Each passage of fluid from one separation chamber to another forces the fluid to encounter one or more changes in velocity, pressure and direction. These changes are accomplished by weirs or dams or square orifices in which, the fluid carried through the chamber is constrained to flow. The weirs acts to alter the head pressure, the direction and the velocity of the flow, which facilitates separation of components having differing viscosities and other physical properties. The liquid that flows through the first separating chamber exits through a weir at the top of the first separation chamber and into the second separation chamber. It is forced to make a one-hundred and eighty degree change in position and flow downward relative to the vertical axis of the cylindrical. At the distal end of the second separation chamber the liquid exits through a rectangular weir into the output separation chamber where it is then forced in a generally upward flow whereupon it exits the device through an output port.

The second separation chamber is closed on each of its six sides having an input weir and an output weir. The main functions of the enclosure is three-fold: to provide an additional stage of separation for any contaminants that escaped separation in the first separation chamber, to provide large flat surfaces to assist in the coalescing of water, and to incorporate weirs that aid in stripping water and contaminants from the petroleum product. This chamber in cooperation with the sump ceiling and a first separation ceiling isolate the input chamber and first separating chamber from the output separation chamber to prevent any contaminants such as water and sediment resident in the sump from invading the output separation chamber, thus keeping the sump constituents isolated from the clean liquid exiting the system. This feature is especially useful in marine and aircraft applications where the pitch and roll of the craft may become extreme and unless the sump constituents are contained could contaminate the cleaner fluids.

The degree of filtration or separation of water and contaminants from oil generally, diesel fuel oil, and gasolines can be increased by employing multiple stages, that is a multiplicity of input chambers, separating plates, and settling chambers of the aforementioned apparatus or process. That is, where the liquid stream flowing toward the output port is diverted by a second chamber and channeled in a generally downward position relative to the point the fluid rose after a first separation the process of altering direction and changing velocity will further aid in separating oil generally, fuel oil, and gasolines from greater specific gravity constituents. For example, fluid containing diverse constituents discharged from the distal end of the second separation chamber, will cause contaminants to come to rest in the bottom of the second chamber while the lighter fluids flow towards the output chamber. The lighter components are again made to rise in the container before they finally flow out of the output port. This process of adding separation chambers and causing the fluid to change direction and impinge a concave surface or flow past a weir can be repeated as often as necessary to achieve the degree of separation required for a given application.

The invention herein disclosed channels the liquid through one or more separating chambers as previously described resulting in purification of petroleum products. The walls of these channels are typically made from either steel or other material having a high surface energy. The surface energy has the effect of allowing water to be attracted. Therefore the large surface areas essentially coalesce the water that contacts its surface. Smaller water particles accumulate into larger droplets until the mass of the water droplet falls under the influence of gravity.

As a system having one or more of the devices connected in either series or parallel the invention will purify petroleum products by removing free water and most sediment in excess of a given amount. The balance of water and sediment gets removed in the typical primary and secondary filters. This technology has an associated purification/flow rate transfer function which means the larger the size the greater the range of flow rates from nil to some upper limit. Larger units can provide purification at higher fuel flow rates. The tradeoff is size and weight.

Unlike its electomechanical centrifugal counterpart, this invention contains no moving parts, except for the external pump needed to keep the liquid oil or fuel flowing. As a result this device has the advantages of purification with: low investment cost, low maintenance costs and high reliability. When the device is employed in a parallel or series operation it is possible to extend its performance range. In a parallel configuration flow rates can be achieved at any desired level. Connected in series improved filtration degrees can be achieved. Typically in an application that uses more than one device, the redundancy of multiple devices improves system reliability since a purification function often can be performed with less than a full compliment of units operational.

The units can also be utilized to recirculate petroleum products, thereby keeping them free of water and other contaminants. In a recirculation mode separation performance during one pass can be improved with subsequent recirculation. This holds for both water and sediment.

The device offers significant versatility. For example: (1) to transfer and simultaneously purify fuel, from land or marine based fuel supplies to a ship's or craft's storage tanks; (2) to recirculate fuel between storage tanks; and (3) to recirculate fuel between the storage tanks and the service or ready day tanks. In its simplest configuration, one or more storage tanks are selected, through one or more of the banks of gate valves controlled either manually or semi automatically through a programmed logic controller or computer, to be pumped through one or more selected devices of the present invention. If a high rate of decontamination is required, then more than one device may be used in parallel operation. In another mode one or more purifying devices are dedicated to purifying fuel in the storage tanks and the balance relegated to transferring fuel from a selected storage tank to a service tank. In yet another mode all of the purifying devices transfer fuel from a selected storage tank to one or both of the service tanks simultaneously. In yet another mode fuel may be transferred and simultaneously purified through the present invention while other modes of transference and purification occurs between or among selected storage or service tanks.

All modes can be switched through corresponding 2-way diaphragm valves operating either manually or semi automatically through a programmed logic controller or computer. This optional control system eliminates the necessity for the operator to manually change modes. In the remote control mode it is possible to control the flow rates during different modes of operation.

Finally, this device may be optionally configured to automatically purge the contamination contents, through a 2-way normally closed direct lift diaphragm valve, when sump sensors are employed to detect that full capacity of the settling chamber or sump is being reached.

An object of the present invention is to separate petroleum based oils and fuels from water and other contaminants.

A second object of the present invention is to increase the isolation between water and contaminants trapped in the sump from contaminating the fluids reaching the output port.

A third object of the present invention is to reduce the cost of fuel purification.

A fourth object is to produce a water fuel separator that has no moving or replaceable filter media.

A fifth object is to produce a water fuel separator that does not require heating to aid in the separation of the water and fuel.

BRIEF DESCRIPTION OF THE DRAWINGS

The novel features of the present invention are set forth with particularity in the appended claims. The invention itself, however, both as to its organization and method of operation, together with further objects and advantages thereof, may be best understood by reference to the following description taken in conjunction with the accompanying drawings, in which:

DESCRIPTION OF THE PREFERRED EMBODIMENTS

Figure 1:
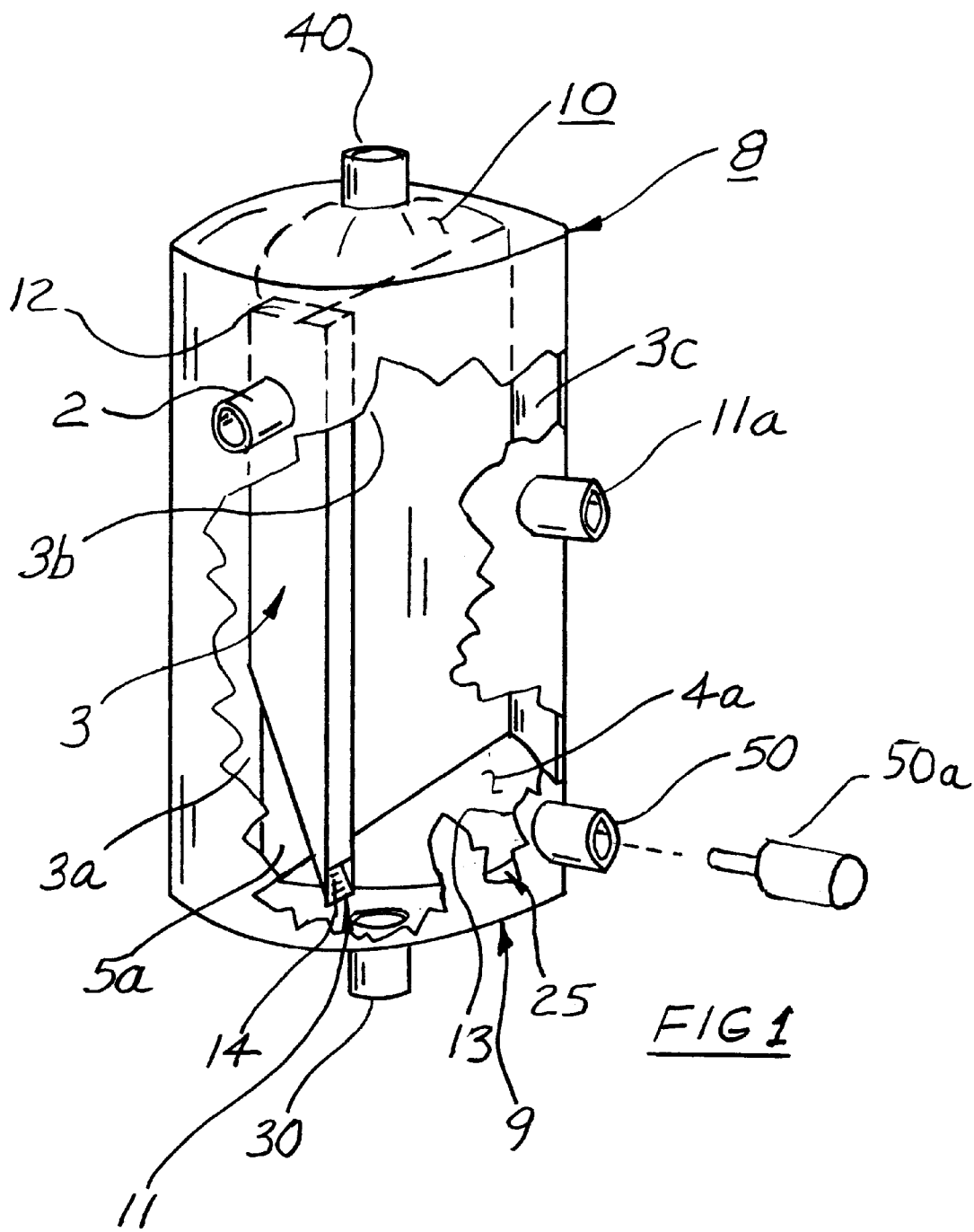
FIG. 1 is a perspective view of the preferred embodiment of the present invention.

In FIG. 1, is shown the present invention comprised of a container 8, having an input port 2 in fluid communication with an output port 11a, a means for increasing velocity on a fluid such that when the fluid containing diverse constituents is forced to impinge a convex surface 13 integral to a settling chamber 25, lighter constituents flow to the output port 11a and heavier constituents come to rest in the settling chamber 25.

In FIG. 1 is shown the cylindrically shaped container 8 with convex ends 9 and 10, although the shape of the body 8 or the ends 9, 10 is not crucial to its operation. In the embodiment shown in FIG. 1 there is an input port 2 which is mounted in a vertical plane approximately two-thirds the distance from the lower end of the convex end 9. Attached to the input port 2 is a longitudinal input chamber 3, also FIG. 2, having a proximal end 12 and a distal end 11, which extends vertically from the input port 2 to a point lower than the input port 2 and above the settling chamber 25. The location of the lower distal end 11 relative to the proximal end 12 is not critical, however it should be sufficiently long to insure the necessary distance that the fluid must travel to attain a velocity and angular momentum sufficient to separate the heaviest constituents from the lightest constituents in the liquid of interest.

As the fluid flows through the system under pressure of a pump (not shown) it enters input port 2 and progresses down chamber 3, discharging through a nozzle 14 and into the settling chamber 25. The fluid being discharged is directed into the concave surface 13, in this case the concave inner wall of container 8, which contact serves to generally cause a circulation of the fluid and thereby force heavier constituents of the fluid in one direction and velocity and lighter constituents in yet another direction and velocity. The heavier constituents, those with specific gravities approaching unity or greater slow in velocity and drop vertically, eventually to lose all momentum and finally come to rest in settling chamber 25.

Figure 3:
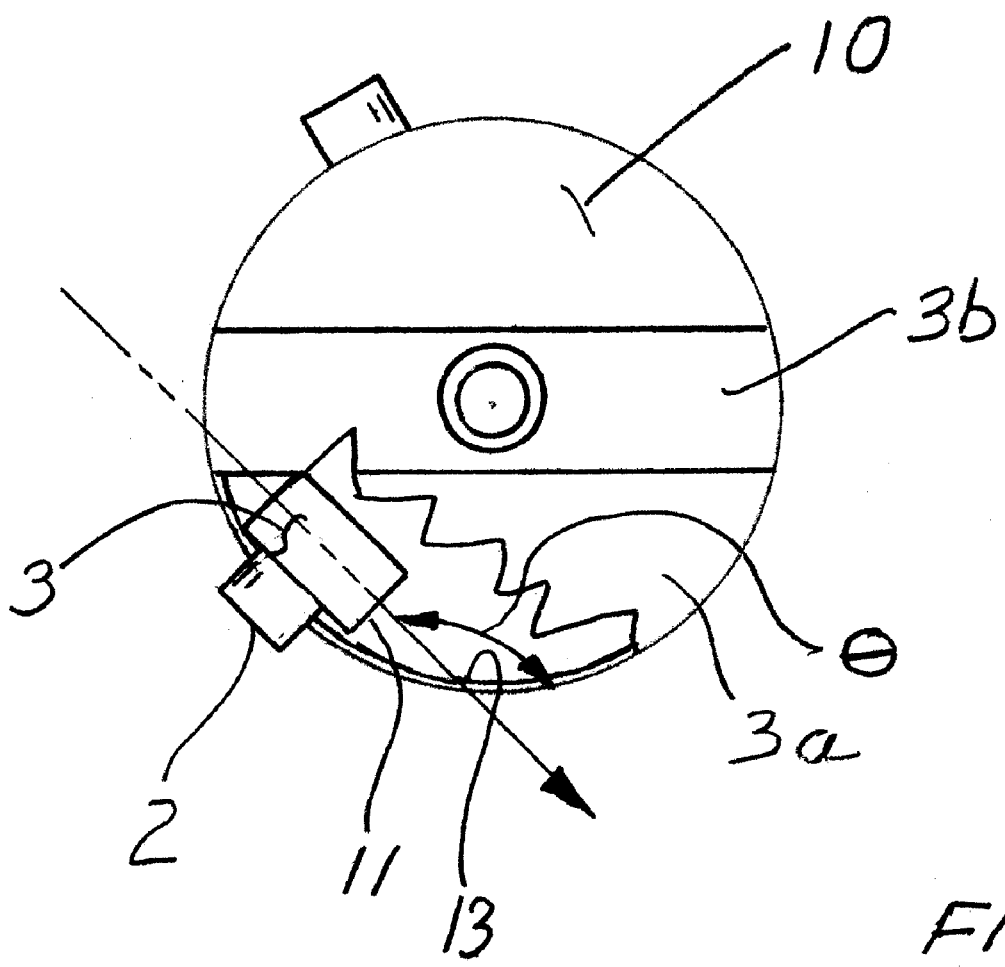
FIG. 3 is a cross section of the preferred embodiment of the present invention.

A key objective is for the liquid to have acquired a rotation in the direction tangent to the radius of curvature of the contacting surface such as the concave surface 13. As indicated in FIG. 3, nozzle 11 which increases the velocity of the fluid flow, and determines its discharge direction, is nominally at an obtuse angle, theta, relative to the concave surface 13. The intention is not to direct the output of the nozzle 14 directly at the concave surface 13, but at a deflecting angle so as to maintain laminar flow and produce a skimming at the concave surface 13 to better insure the production of a circular motion. For the concave surface 13 with its height oriented in the vertical plane, the radius of curvature of the internal cylindrical wall is in the horizontal plane. A liquid discharging from the nozzle 14 would ideally have a rotation in the direction of a tangent to the horizontal radius of curvature of the concave surface 13.

Figure 2:
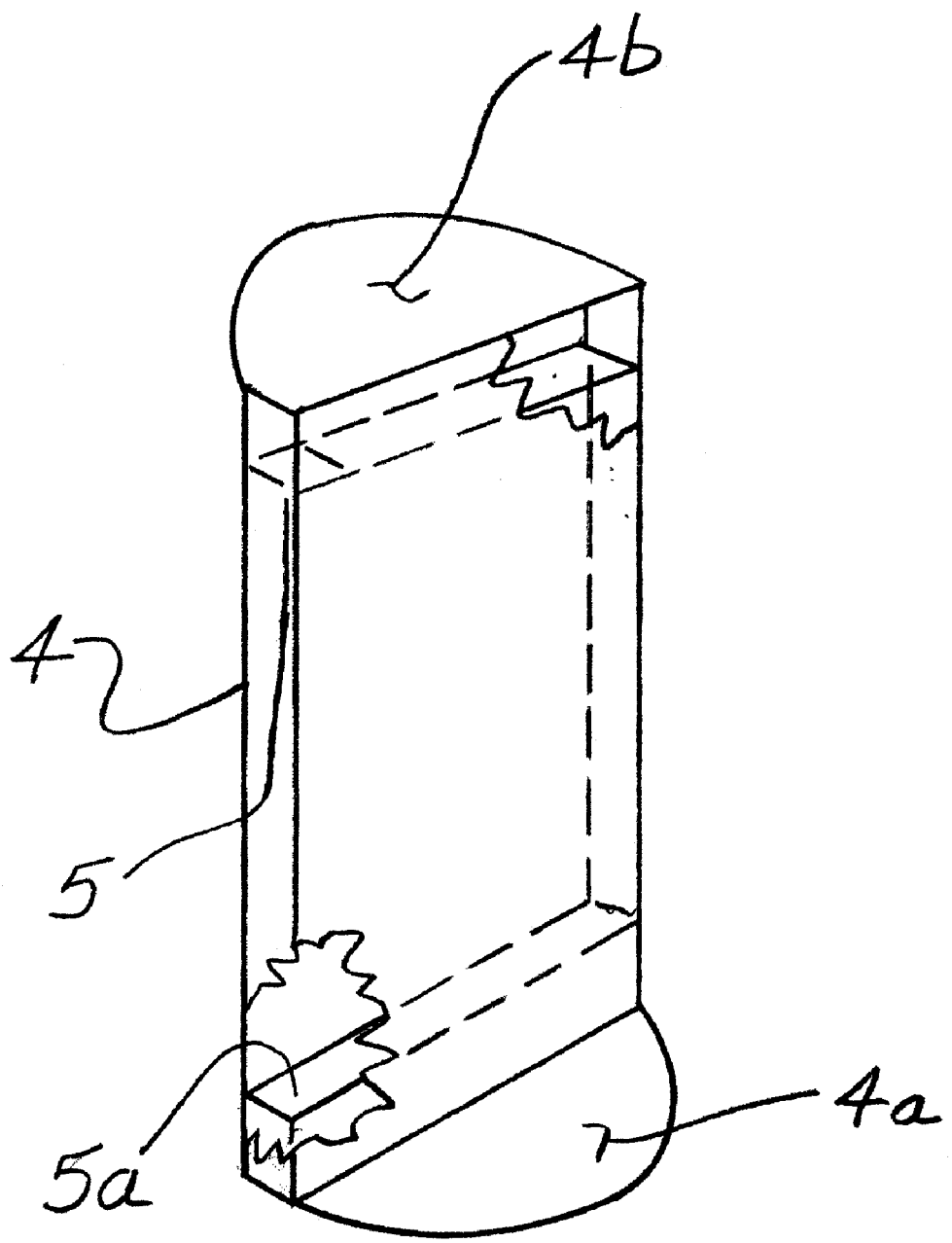
FIG. 2 is a perspective view of the second separation chamber.

The lighter constituents those with specific gravities less than unity are forced upward bypassing the settling chamber 25 and remain in the current created by the pump with the effect of passing through a first separation chamber 3a and then through a weir FIG. 2, item 5, in a plate 4, into a second separation chamber 3b, and changing direction one-hundred and eighty degrees so as to flow downwardly through chamber 3b and discharging through a second weir 5a, before being directed upwardly through an output separation chamber 3c and thence to the output port 11a. The weirs 5 and 5a in FIG. 2 are shown as rectangular, however, other geometries such as circular apertures may be employed with similar effect. One or more optional second separation chambers 3b may be inserted between the first separation chamber 3a and the output chamber 3c, whereby fluid communication takes place through replicas of the weir 5a and weir 5b, respectively. It will be understood by those skilled in the art that additional stages of separation chambers such as 3b can be utilized to improve the degree of separation.

The imposition of the second separation chamber 3b cooperating with a ceiling 4a and a ceiling 4b, also serves the purpose of reducing any errant contaminant communication, between the settling chamber 25 and the second separation chamber 3b, and output chamber 3c, as might occur during periods of vehicle or craft pitch and roll. The ceiling 4b isolates the output chamber 3c from the separation chamber 3b and the separation chamber 3a.

The imposition of metallic materials for the side walls for the separation chambers 3b and the ceiling 4a and ceiling 4b, also serves the purpose of causing small water particles to coalesce or form larger water droplets on the metal plates and which eventually fall to the bottom of the separation chambers or into the settling chamber 25.

A valved output port 30 is used to empty the contents of the settling chamber 25 when it has reached the level of the ceiling 4a. A fill port 40 is used to prime or fill the vessel with liquid prior to operation.

Figure 4:
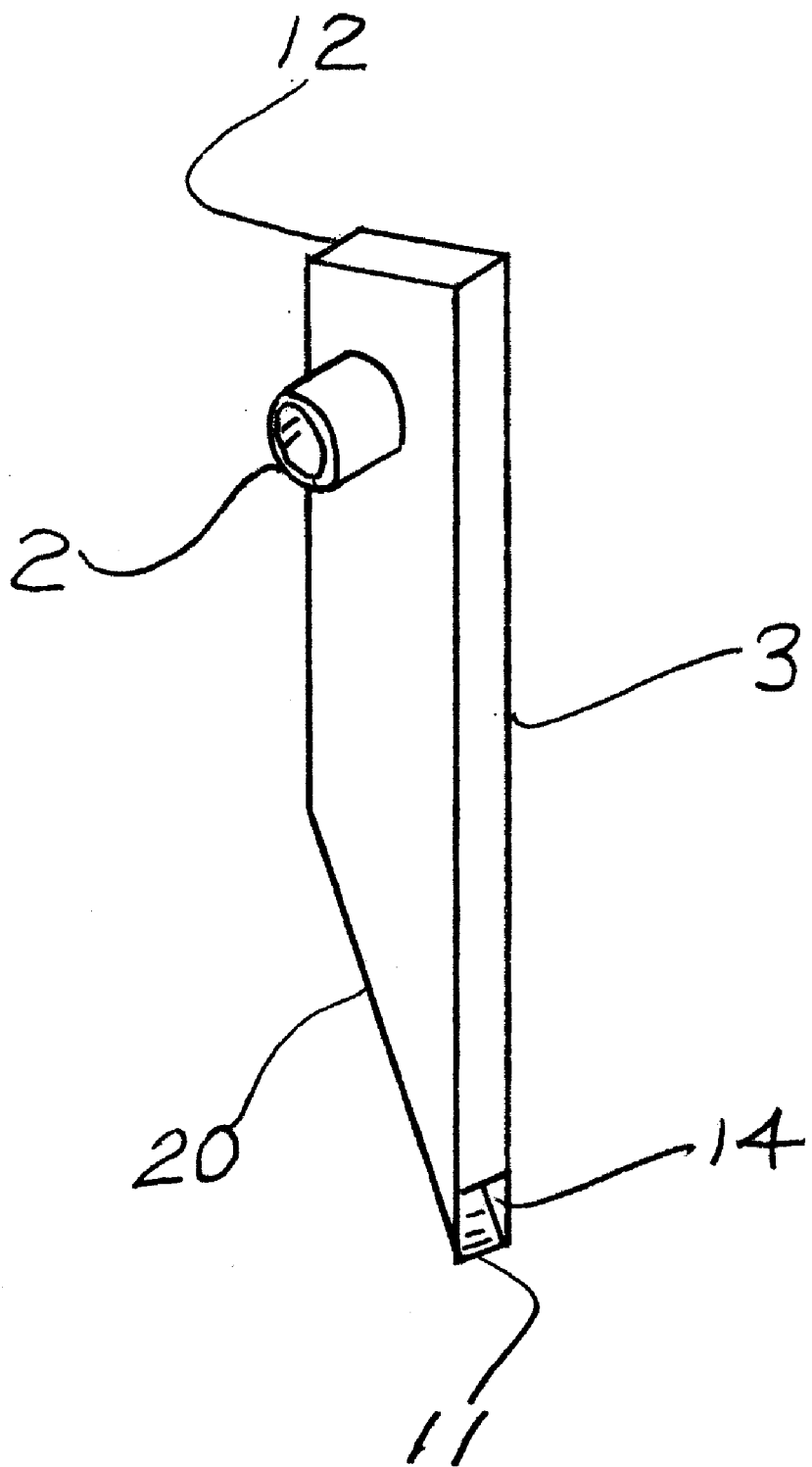
FIG. 4 is a view of one embodiment of a longitudinal diverter input chamber.

In FIG. 4, the inclined or sloped cross section 20 serves to increase the velocity and therefore the kinetic energy of the liquid as it flows towards the nozzle 14. Although the generally rectangular cross section is the preferred embodiment, other cross sectional shapes such as a funnel shaped cross section, will perform substantially equally well in increasing the velocity and forcing the liquid into the nozzle 14 with the required pressure while retaining a substantially laminar fluid flow.

Nozzle 14 is rectangular in shape in the preferred embodiment, however, other cross sectional shaped orifices, such as a conical section will perform substantially equally well in forcing the liquid into the concave surface 13 with the required pressure while retaining a substantially laminar flow.

Port 50 is an auxiliary port that is utilized to gain access to the settling chamber 25 for purposes of inserting a device that can measure when the level of water or other contaminants equal or exceed the volume of the settling chamber 25. The volume is exceeded or reached when the ceiling 4a contacts the accumulated water or other contaminants which would thereby indicate the necessity to empty the settling chamber 25 through valved output port 30. One such a device that functions to detect water in the settling chamber 25 is a metallic probe(50a), insulated from its housing and surrounding environment, which constitutes one contact of a single pole switch. The other pole is the probe's metallic housing. Petroleum oils are typically very low in electrical conductivity whereby water is high in electrical conductivity. When water contacts the probe its conductivity serves to complete a circuit, much like a switch closure, to operate any number of electrical devices that through the completion of a circuit provides an audio, visual or other electronic signal. The electronic signal in combination with a solenoid valve controlling the flow through valve 30 can serve to automatically discharge the settling chamber 25.

Figure 5:
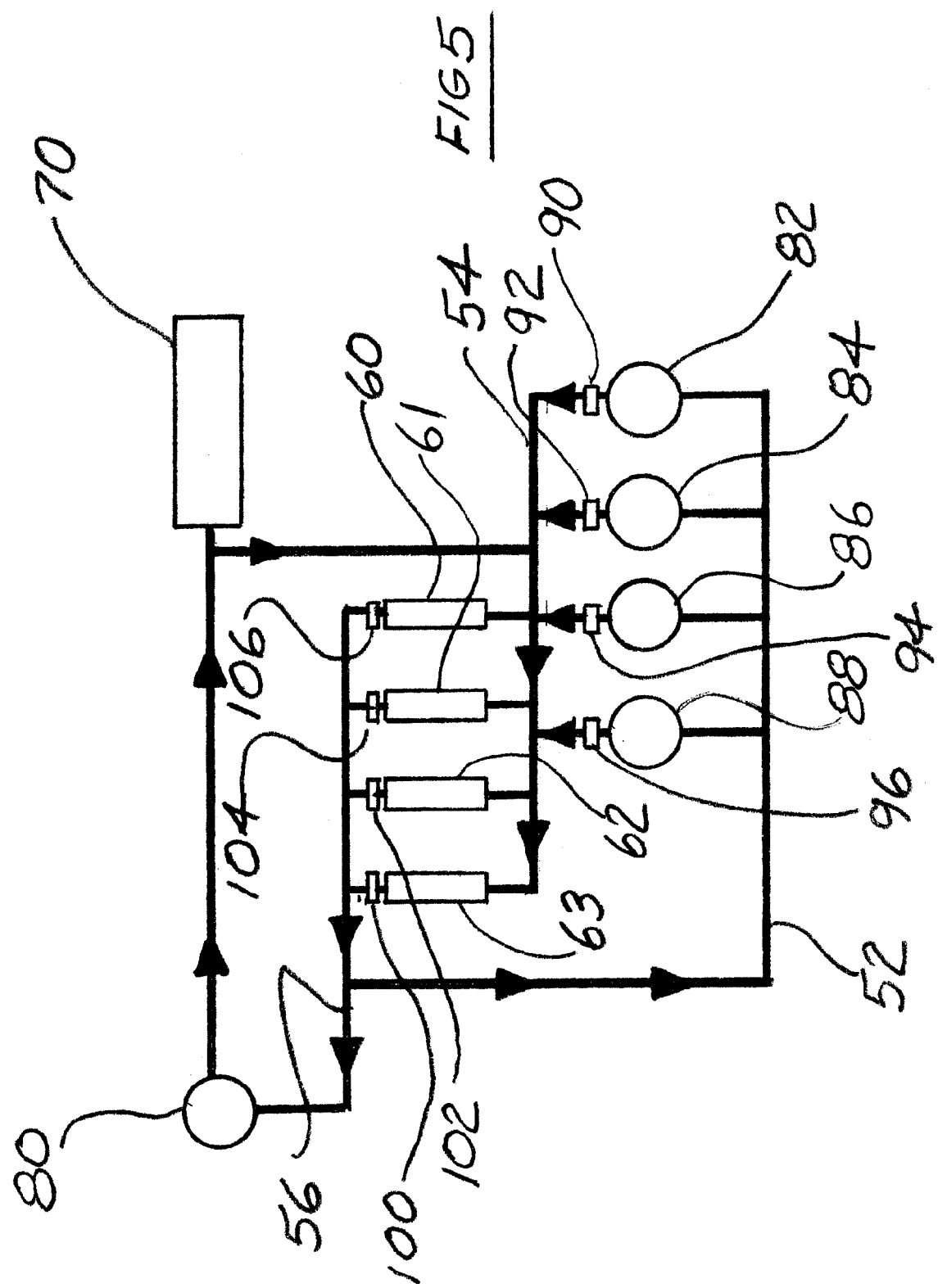
FIG. 5 is a flow diagram showing a system employing multiple devices for purifying petroleum resident in a storage tank that supplies fuel.

FIG. 5 shows a system comprised of several apparatuses 8, such as depicted by devices 60, 61, 62 and 63 connected in a parallel operation. The devices 60 through 63 are interposed between an array of petroleum storage tanks 82, 84, 86, and 88 and a service tank 80. Service tank 80 feeds petroleum to machine 70. Machine 70 may be a combustion engine, a boiler or any other device that requires uncontaminated fuel or petroleum to operate.

The apparatuses in the configuration of FIG. 5 are utilized to provide options regarding the manner of recirculating fuel oil between and among storage tanks and to prove purified fuel to a machine such as an engine or boiler.

FIG. 5 consists a process for purifying a petroleum products, by pumping (pump unshown) fuel and its undesirable constituents, through one or more of a plurality of the apparatuses 8 such that constituents with the greater specific gravity come to rest in the settling chamber 25 and returning constituents with the lesser specific gravity through output port 30 to one or more storage tanks 82 through 88, or consuming constituents with the lesser specific gravity in the machine 70.

Petroleum pipelines represented in items 52, 54, and 56 represent multiple fluid lines, such that any storage tank from 82 through 88 can direct its contents under the force of a pump to any device 60 through 63. And, any device 60 through 63 can direct any one or more of the outputs the force of a pump through one or more pipe lines represented by item 52 to any one or more storage tanks 82 through 88.

In FIG. 5 the operation of the devices 60 through 63 are controlled by a set of valves 100, 102, 104 and 106. These valves control the rate of flow through the devices 60 through 63, in a range from full on to full off. Likewise valves 90, 92, 94 and 96 control the flow from the storage tanks, 82 through 88 in a range from full on to full off.

In the present invention the valves (either manually actuated or electrically actuated) represented by 90 through 96 and 100 through 106 can be respectively manually controlled, controlled by an electrically switched operation or controlled automatically at stated times and intervals utilizing a programmed logic controller or a computer.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed is:

1. An apparatus for purifying a fluid having at least two immiscible constituents with diverse properties, where at least one such property is specific gravity, comprising a container having an input port in fluid communication with an output port, a longitudinal input chamber of decreasing cross section directing the flow of the fluid substantially ninety-degrees downward having a discharge nozzle directing the fluid to impinge a concave surface interposed between the input port and a settling chamber, such that constituents with the greater specific gravity come to rest in the settling chamber, and constituents with the lesser specific gravity proceed through a first separation chamber and flow past a vertical plate, into one or more separation chambers, said vertical plate separating the first separation chamber from said one or more separation chambers, the last of which is in fluid communication the output port.

2. The apparatus as in claim 1, wherein the container has a generally cylindrical shape.

3. The apparatus as in claim 1, wherein upon impinging upon the concave surface, the lesser specific gravity constituents flow through a separation chamber and then to the output port.

4. The apparatus as in claim 3 wherein at least two plates comprise a chamber through which lesser specific gravity constituents from the separation chamber are passed on to an output separation chamber.

5. The apparatus as in claim 4 wherein the separation chamber discharges into a second separation chamber and channeled in a downward position relative to the point the lesser specific gravity constituents rose in the first separation chamber and then discharges into an output chamber before it is discharged into the output port.

6. The apparatus as in claim 1, contains a means for measuring when the level of heavier constituents equal or exceed the volume of the settling chamber.

7. An apparatus for purifying a fluid having at least two immiscible constituents with diverse properties, where at least one of such property is specific gravity, comprising a container having an input port in fluid communication with an output port, a chamber of decreasing cross section directing the flow of the fluid substantially ninety-degrees downward and a discharge nozzle directing the fluid into a concave surface, interposed between the input port and the output port, and integral to a settling chamber, such that constituents with the greater specific gravity come to rest in the settling chamber and constituents with the lesser specific gravity proceed through a first separation chamber and flow past a vertical plate, into a second separation chamber, said vertical plate separating the first separation chamber from said second separation chambers, the last of which is in fluid communication with the output port.

* * * * *